United States Patent
Hensen

(10) Patent No.: US 11,718,158 B2
(45) Date of Patent: Aug. 8, 2023

(54) SYSTEM FOR ACTUATING AND LOCKING AN AUTOMOBILE SUN VISOR

(71) Applicant: Eric Hensen, Piedmont, AL (US)

(72) Inventor: Eric Hensen, Piedmont, AL (US)

(73) Assignee: K & E Holdings, LLC, Melbourne, FL (US)

( * ) Notice: Subject to any disclaimer, the term of this patent is extended or adjusted under 35 U.S.C. 154(b) by 360 days.

(21) Appl. No.: 16/750,677

(22) Filed: Jan. 23, 2020

(65) Prior Publication Data

US 2020/0231026 A1 Jul. 23, 2020

Related U.S. Application Data

(60) Provisional application No. 62/795,749, filed on Jan. 23, 2019.

(51) Int. Cl.
| | |
|---|---|
| *B60J 3/02* | (2006.01) |
| *G01S 17/931* | (2020.01) |
| *B60W 30/09* | (2012.01) |
| *G01S 13/931* | (2020.01) |

(52) U.S. Cl.
CPC .............. *B60J 3/026* (2013.01); *B60J 3/0278* (2013.01); *B60W 30/09* (2013.01); *G01S 17/931* (2020.01); *G01S 13/931* (2013.01); *G01S 2013/93276* (2020.01)

(58) Field of Classification Search
None
See application file for complete search history.

(56) References Cited

U.S. PATENT DOCUMENTS

| | | | | |
|---|---|---|---|---|
| 5,902,002 | A * | 5/1999 | Wilson | B60J 3/0208 296/97.13 |
| 2005/0040667 | A1* | 2/2005 | Schneider | B60R 21/214 296/97.12 |
| 2017/0100992 | A1* | 4/2017 | Ruybal | B60J 3/0256 |
| 2020/0164724 | A1* | 5/2020 | Kister | B60J 3/0204 |
| 2021/0039483 | A1* | 2/2021 | Kister | B60J 3/0226 |

FOREIGN PATENT DOCUMENTS

| | | | |
|---|---|---|---|
| JP | 2008221882 A | * | 9/2008 |
| KR | 101596619 B1 | * | 2/2016 |

OTHER PUBLICATIONS

Machine translation of JP-2008221882-A (Sep. 2008) (Year: 2008).*
Machine translation of KR101596619B1 (Feb. 2016) (Year: 2016).*

* cited by examiner

*Primary Examiner* — Isaac G Smith
*Assistant Examiner* — Jennifer M Anda
(74) *Attorney, Agent, or Firm* — Widerman Malek, PL; Daniel C. Pierron

(57) ABSTRACT

A sun visor actuation system including an attachment apparatus configured to attach to an automobile structure, an arm member rotatably attached to the attachment apparatus, a body member attached to the arm member, and an actuation system. The actuation system is operable to at least one of rotate the body member and prevent the rotation of the body member responsive to an indication of an imminent collision.

8 Claims, 2 Drawing Sheets

SYSTEM FOR ACTUATING AND LOCKING AN AUTOMOBILE SUN VISOR

RELATED APPLICATIONS

This application claims priority under 35 U.S.C. § 119(e) of U.S. Provisional Patent Application Ser. No. 62/795,749 filed on Jan. 23, 2019 and titled System for Actuating and Locking an Automobile Sun Visor. The content of this application is incorporated herein by reference.

FIELD OF THE INVENTION

The present invention relates to systems for actuating an automobile sun visor.

BACKGROUND OF THE INVENTION

Starting in 1924, automobiles began to include an exterior sun visor on its closed body versions. The sun visor in passenger cars have looked the same for decades, with only minor changes in looks and material use. The current sun visor is located on the inner ceiling above the front seats in the driving compartment of the car. The function of the sun visor is to increase visibility by protecting the driver from light that can disturb the driving, regardless of where the light is coming from. This design essentially hasn't changed dramatically since. Occupants of seats associated with sun visors, whether they are wearing their seat belts or not, can suffer impacts with sun visors in collisions. The occupants' heads can move upward and forward into the sun visors. Injury from the sun visor itself, as well as objects attached to the sun visor (e.g. remote garage door openers, sun glass cases, etc.) are possible in the industry. *Vehicular Accident Investigation and Reconstruction* by Donald J. Van Kirk, CRC Press (2000).

By employing a visor locking system on both the driver and passenger side both front and side impact of the vehicle where the Supplemental Restraint System (for instance, airbags) is deployed and when the anti-lock braking system (ABS) this will engage the locking mechanism of the visor support system (skeleton, axis and ceiling mounting bracket). By connecting the ABS and Supplemental Restraint System computer with the visor locking system of the present invention, this will allow the visor to be secured in such a position that the scalp, forehead, midface and lateral aspect of the head of the occupants in the front and passage seats will no longer be put in such a position, thus eliminating the trauma that occurs when the driver or passenger strikes the visor. Accordingly, there is a need in the industry for a system for locking an automobile sun visor so as to reduce the chance of head injuries from the visor. There is also a need for positioning a sun visor in a preferred position responsive to an indication of a collision or an imminent collision.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a sun visor actuation system comprising an attachment apparatus configured to attach to an automobile structure, an arm member rotatably attached to the attachment apparatus, a body member attached to the arm member, and an actuation system. The actuation system may be operable to at least one of rotate the body member and prevent the rotation of the body member responsive to an indication of an imminent collision.

In some embodiments, the actuation system may comprise a controller configured to receive an indication of an imminent collision, an actuation member operably connected to the controller, a first rotating member coupled to the actuation member, and a second rotating member coupled to the first rotating member. The controller may be configured to operate the actuation member responsive to receiving an indication of an imminent collision. Operation of the actuation member causes the first rotating member to rotate, and the coupling of the second rotating member to the first rotating member causes the second rotating member to rotate responsive to rotation of the first rotating member. In some embodiments, the actuation member may be one of a stepper motor and a solenoid. In some embodiments, each of the first rotating member and the second rotating member are pinion gears configured to engage with each other. In further embodiments, the attachment apparatus may comprise an elbow section, the first rotating member may be positioned within a section of the attachment apparatus, and the second rotating member may be positioned partially within a section of the attachment apparatus and partially within the arm member. The first rotating member and the second rotating member may be configured to engage with each other within the elbow section. In additional embodiments, the controller may be configured to receive an input from at least one of a supplemental restraint system, an anti-lock braking system, an advanced emergency braking system, an autonomous emergency braking system, a RADAR system, a LIDAR system, or a camera system. The controller may be configured to determine if the input meets a criterion for engaging the actuation system. Additionally, in further embodiments, the controller may be configured to determine a present angular position of the body member, determine a desired second angular position for the body member, and operate the actuation member to rotate the body member form the present angular position to the desired second angular position.

In some embodiments, the actuation system may be operably coupled to a device associated with an automobile within which the sun visor actuation system is installed.

In some embodiments, the arm member may comprise an outer tube member, an inner tube member positioned within the outer tube member and comprising an attachment member configured to attach to the body member, a piston cap positioned at a proximal end of the outer tube member and attached to a proximal end of the inner tube member, and a spring attached to a distal end of the inner tube member, such that it exerts a lateral force on the inner tube member in a proximal direction. The actuation system may comprise a pressurized gas container positioned in fluidic communication with the piston cap. Upon an indication of an imminent collision the pressurized gas container may be opened, increasing a pressure exerted upon the piston cap such that a force from that pressure exceeds the force exerted on the inner tube member by the spring, resulting in lateral translation of the inner tube member in a distal direction. Distal lateral translation of the inner tube member may cause at least one of locking the attachment member in a present angle and rotating the attachment member.

In further embodiments, the outer tube member may comprise an interior wall comprising a recessed section and an angled section, distal lateral translation of the inner tube member when the body member is positioned adjacent to a roof of the automobile results in seating the attachment member in the recessed section, thereby preventing rotation of the attachment member about a longitudinal axis of the arm member, and distal lateral translation of the inner tube member when the body member is positioned away from the roof may cause the interfacing between the attachment member and the angled section, causing the attachment member to rotate about the longitudinal axis of the arm member; resulting in the rotation of the body member to a desired position.

In further embodiments, the spring may exert a force upon the inner tube member sufficient to prevent unintentional distal lateral translation of the attachment member into the recessed section during normal operation prior to an indication of an imminent collision. In some embodiments, the angled section may be curved.

In some further embodiments, the inner tube member may comprises a plurality of attachment members, the outer tube member may comprise a plurality of interior walls, each interior wall comprising a recessed section and an angled section, and the number of attachment members and of interior walls are equal.

In some further embodiments, the actuation system may further comprise a tube positioned in fluidic communication with each of the pressurized gas container and the piston cap, thereby positioning the pressurized gas container in fluidic communication with the piston cap. In some further embodiments, the pressurized gas container may be configured to be replaceable.

In some further embodiments, the actuation system may comprise a controller operably coupled to the pressurized gas container; the controller is configured to receive an input from at least one of a supplemental restraint system, an anti-lock braking system, an advanced emergency braking system, an autonomous emergency braking system, a RADAR system, a LIDAR system, or a camera system, the controller may be configured to determine if the input meets a criterion for engaging the actuation system, and upon determining the input meets the criterion the controller opens the pressurized gas container.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
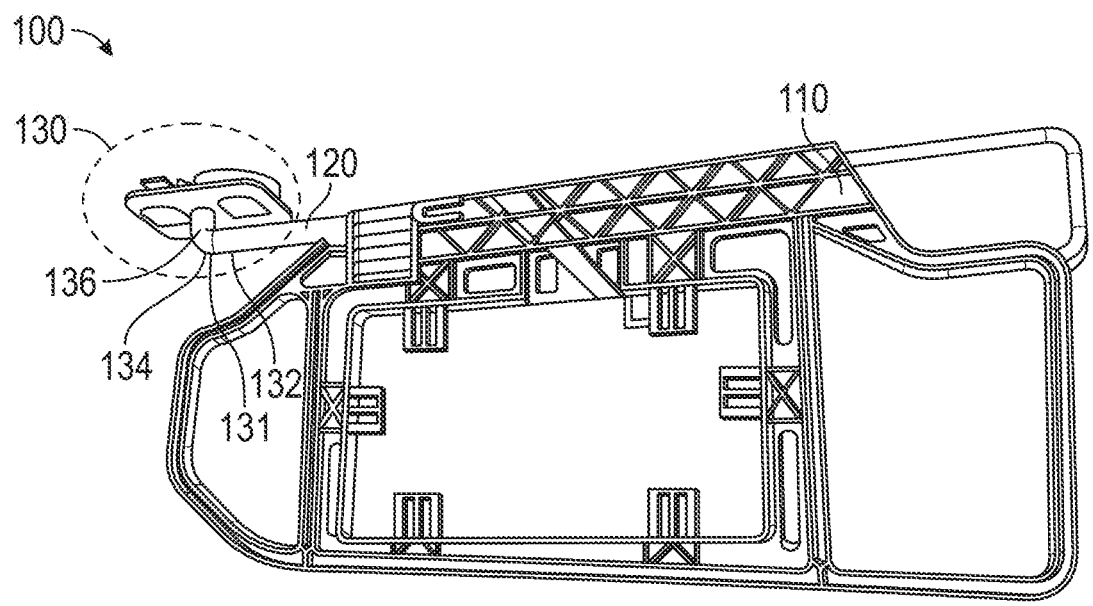
FIG. 1 is a perspective view of an automobile sun visor comprising a system for actuating the same according to an embodiment of the invention.
Figure 2:
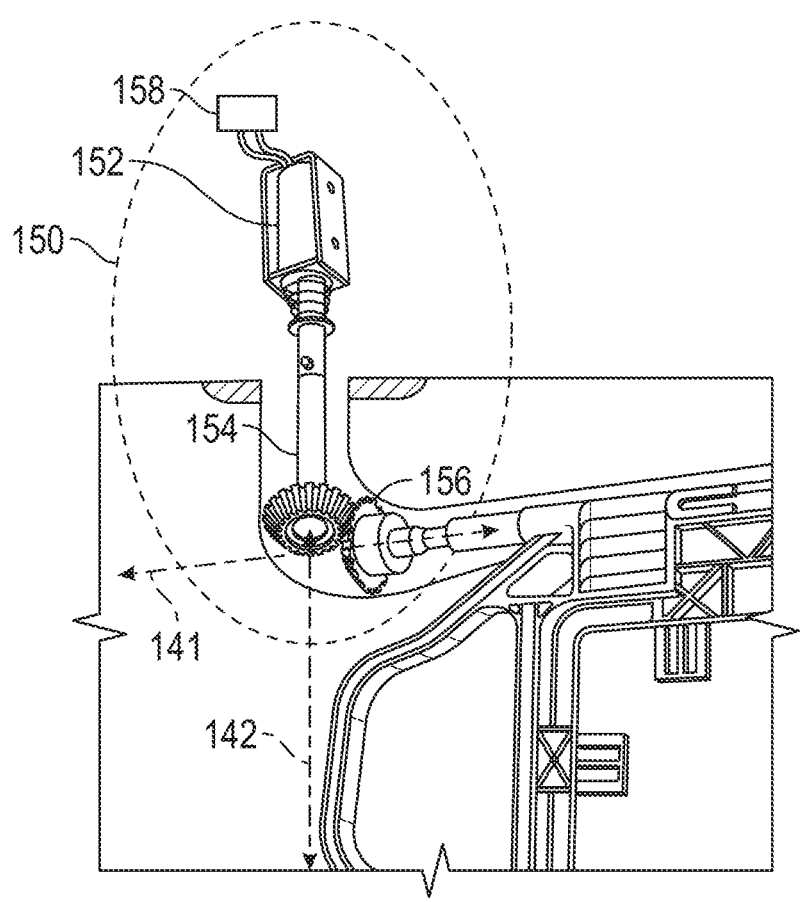
FIG. 2 is a sectional view of the actuating system of the sun visor of FIG. 1.

An embodiment of the invention, as shown and described by the various figures and accompanying text, provides a locking system for an automobile sun visor. As shown in FIGS. 1-2, an embodiment of the invention may comprise a visor apparatus 100 comprising a body member 110, an arm member 120, and an attachment apparatus 130. The body member 110 may be configured to have a sufficiently large surface area to provide effective blocking of the sun by an occupant of a vehicle comprising the visor apparatus 100. The body member 110 may further comprise characteristics typical of automobile sun visors, including, but not limited to, a mirror, a light, a pocket, electronics related to transmitters for automatic garage doors, and the like. The body member 110 may be attached to and carried by the arm member 120.

The attachment apparatus 130 may comprise a housing 131 comprising an arm attachment section 132, an elbow section 134, and an automobile attachment section 136. The arm attachment section 132 may be configured to attach to the arm member 120 and the elbow section 134. In some embodiments, the arm attachment section 132 and the elbow section 134 may be integrally formed. The attachment between the arm attachment section 132 and the arm member 120 may be such that rotation of the arm attachment section 132 about a longitudinal rotational axis 141 may cause the arm member 120 and the body member 110 to be similarly rotated about the longitudinal rotational axis. Similarly, rotation of the arm attachment section 132 about an elbow rotational axis 142 may result in the rotation of the arm member 120 and the body member 110 about the elbow rotational axis 142. The automobile attachment section 136 may be configured to attach the attachment apparatus 130 to a section of an automobile as is known in the art. The elbow section 134 may be rotatably connected to and carried by the automobile attachment section 136 such that the elbow section 134 may rotate about the elbow rotational axis 142.

The visor apparatus 100 may further comprise an actuation system 150. The actuation system 150 may be operable to effectuate the rotation of the body member 110 to a desired position responsive to an input. Types of inputs may include, but are not limited to, collision detection, opening and/or closing of an adjacent door, or detection of potential glare conditions.

The actuation system 150 may comprise an actuation member 152, a first rotating member 154, a second rotating member 156, and a controller 158. The controller 158 may be operably connected to the actuation member 152 and configured to control actuation of the actuation member 152. Actuation of the actuation member 152 may result in the rotation of the first rotating member 154 about a longitudinal axis thereof, which may be coaxial with elbow rotational axis 142. Embodiments of the actuation member 152 include a solenoid, and/or a motor, such as a stepper motor. However, such embodiments are exemplary only, and any actuator that may rotate the first rotating member 154 is contemplated and included within the scope of the invention.

The first and second rotating members 154, 156 may be engaged with one another such that rotation of the first rotating member 154 may cause rotation of the second rotating member 156 about a longitudinal axis thereof, which may be coaxial with the longitudinal rotational axis 141. In some embodiments, the first and second rotating members may be configured as cooperating pinion gears, such as angled pinions. However, such embodiments are exemplary only and any engagement between the first and second rotating members 154, 156 that may result in transmission of actuation by the actuation member 152 is contemplated and included within the scope of the invention. Each of the first and second rotating members 154, 156 may be positioned at least partially, and in some embodiments entirely, within the housing 131.

The controller 158 may be positioned in communication with one or more inputs. Such inputs may include one or more of collision detection systems, door monitoring systems, or light monitoring systems associated with an automobile comprising the visor apparatus 100. Types of collision detection systems include, but are not limited to, supplemental restraint systems, anti-lock braking systems, advanced emergency braking systems, autonomous emergency braking, or any other collision detection systems, including, but not limited to, those utilizing RADAR, LIDAR, or cameras.

The controller 158 may be configured to receive inputs from the above-described systems and evaluate the input to determine if criteria for engaging the actuation system is met. Such criteria may include an indication of an imminent collision, an indication of a door opening, or an indication of a level of glare an occupant of a seat associated with the body member 110 is likely to experience that may inhibit the occupant's vision.

In some embodiments, the actuation system 150 may be operable to prevent rotation of the body member 110. More specifically, the controller 158 may be configured to operate the actuation member 152 to as to prevent the rotation of the body member 110 responsive to an input indicating the potential for an event that might cause the unintentional movement of the body member 110, such as an imminent collision. The controller 158 may receive an input and determine the input meets criteria about an imminent collision, e.g. that a collision is imminent. Upon determining the input meets the criteria about an imminent collision, the controller 158 may operate the actuation member 152 to prevent the rotation of the first rotating member 154, the second rotating member 156, and by extension the body member 110. In this way, the inertia of the body member 110 and the likely unintended rotation as a result of a collision may be counteracted and prevented, thereby preventing the body member 110 from rotating into a position in the path of a likely trajectory of the head of an occupant of a seat with which the body member 110 is associated.

Furthermore, the actuation system 150 may be configured to permit the free rotation of the body member 110 when an input meeting criteria has not been detected. This allows the occupant to position the body member 110 anywhere within the range of motion of the attachment apparatus 130 as for current automobile sun visors.

In some embodiments, upon determining the input meets the criteria, the controller 158 may operate the actuation member 152 to rotate the first rotating member 154, and by extension the second rotating member 156, thereby causing the body member 110 to rotate about the longitudinal rotational axis 141. The controller 158 may be configured to operate the actuation member 152 such that the body member 110 is moved to a desired position.

In some embodiments, when the controller 158 determines an input about an imminent collision meets the criteria, it may operate the actuation member 152 such that the body member 110 is positioned generally adjacent to a ceiling of the automobile, thereby positioning the body member 110 out of the likely trajectory of the head of the occupant of a seat of the automobile with which the body member 110 is associated. Alternatively, the controller 158 may operate the actuation member 152 such that the body member 110 is positioned as close to a windshield of the automobile as is possible, also positioning the body member 110 out of the likely trajectory of the head of the occupant. In some embodiments, the controller 158 may be operable to determine from an input that a door associated with the seat with which the body member 110 is associated is opened and may operate the actuation member 152 to position the body member 110 adjacent the ceiling of the automobile such that the body member 110 does not interfere with the ingress or egress of the occupant to/from the seat. In some embodiments, the controller 158 may be operable to determine from an input that light entering a cabin of the automobile is likely to cause glare to the occupant and may operate the actuation member 152 to position the body member 110 as close to a windshield of the automobile as is possible, thereby likely obscuring the occupant from the source of the glare.

In some embodiments, the controller 158 may be configured to monitor the present position of the body member 110. In some of such embodiments, the actuation member 152 may be operable to provide an indication to the controller 158 of the position of the body member 110. In some of such embodiments, the controller 158 may be configured to control the rotation of the actuation member such that actuation member 152 rotates by a desired angular distance, such that the body member 110 may be moved from a known first position to a desired second position by operating the actuation member 152 to rotate from a known first angular position to a desired second angular position. The controller 158 may further be configured to maintain the known second angular position of the actuation member 152 until a desired position of the body member is indicated, at which point the controller 158 may operate the actuation member 152 to rotate to a third angular position.

In some embodiments, the actuation system 150 may not comprise a controller. In such embodiments, operation of the actuation member 152 may be controlled by a device associated with the automobile, such as a controller comprised by an anti-collision system as mentioned hereinabove.

Figure 3:
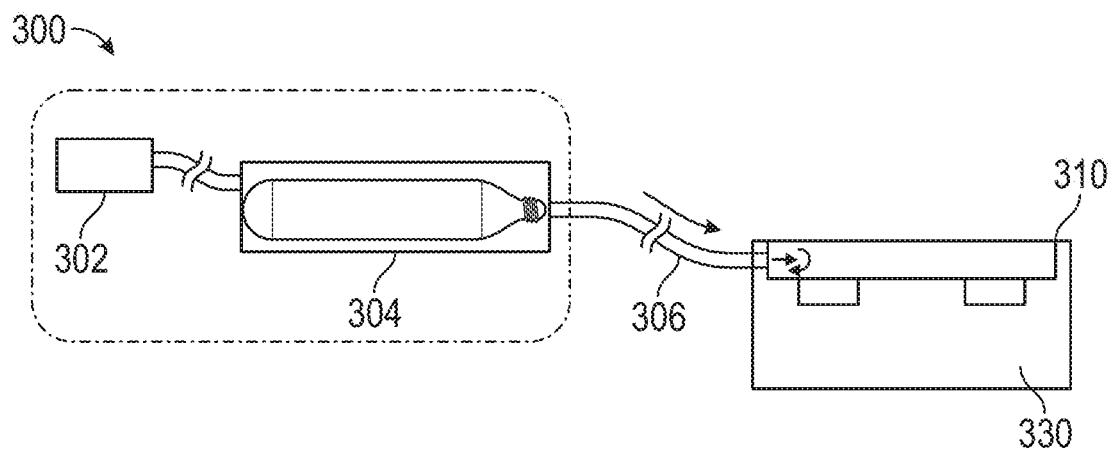
FIG. 3 is a schematic view of an actuating system and arm member of a sun visor actuating system according to an embodiment of the invention.
Figure 4:
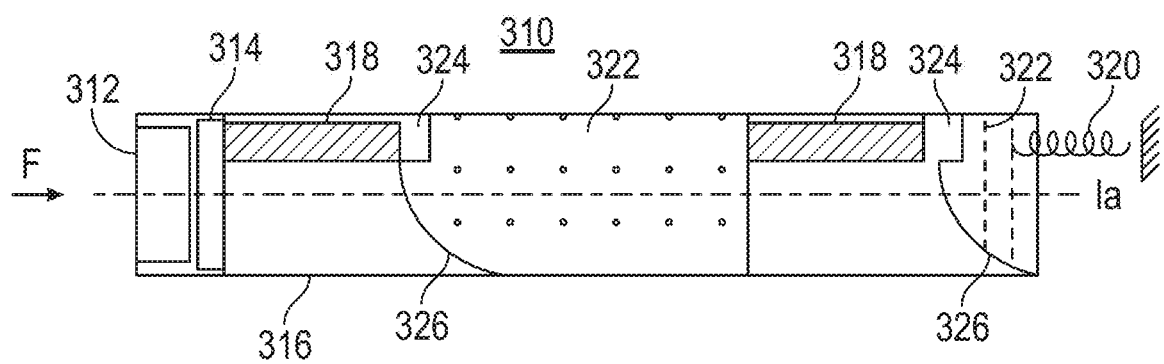
FIG. 4 is a sectional view of the arm member of FIG. 3.

Referring now to FIGS. 3 and 4, another actuation system 300 according to an embodiment of the invention is presented. The actuation system 300 may comprise a controller 302 as described hereinabove and a pressurized gas container 304 operably coupled to the controller 302. The pressurized gas container 304 may be any container that contains a pressurized gas and allows for the release of the gas there from. The gas contained by the pressurized gas container may be any gas as is known in the industry, including, but not limited to, air, nitrogen, carbon dioxide, and the like. In some embodiments, the pressurized gas container 304 may be replaced with a solid-propellant inflator as is known in the air bag industry. In any embodiment, the release of the gas may be controlled by the controller 302, where the controller initiates release of the gas responsive to an indication of an imminent collision as described hereinabove.

In some embodiments, the pressurized gas container 304 may be configured to one or a limited number of uses, such that upon reaching the designed number of uses, the pressure and quantity of gas contained thereby is no longer sufficient to operate and must be replaced. In such embodiments, the pressurized gas container 304 may be replaceable, i.e. configured to be removed from the actuation system 300 and replaced with a new container having sufficient pressurized gas to operate the actuation system 300.

Similar to the embodiments above, the present embodiment comprises an arm member 310 and a body member 330. The body member 330 may be attached to the arm member 310 such that when the section of the arm member 310 to which the body member 330 is attached rotates, the body member 330 is similarly rotated. The arm member 310 may comprise a piston cap 312, an inner tube member 314, and an outer tube member 316. The piston cap 312 may be positioned within an interior of the outer tube member 316 and at a proximal end of the outer tube member 316. Adjacent to the piston cap 312 is the inner tube member 314. The inner tube member 314 may comprise one or more attachment members 318. The attachment members 318 may be configured to extend generally away from a longitudinal axis 1a of the arm member 310 be attached to the body member 330. While the present embodiment of the arm member 310 comprises two attachment member 318, any number of arm members, including one or a plurality, is contemplated and included within the scope of the invention. The inner tube member 314, and by extension the attachment members 318, are positioned so as to rotate about the longitudinal axis 1a with independent of the outer tube member 316, i.e. the inner tube member 314 may rotate while the outer tube member 316 does not rotate.

The arm member 310 may further comprise a spring 320. The spring 320 may be attached at one end to a distal end of the inner tube member 314. The spring 320 may be attached at an opposite end to another structure to facilitate compression of the spring, such as a distal end of the outer tube member 316, the body member 330, or any other structure that may provide such a resistive force. The spring 320 may be positioned to exert a force upon the inner tube member 314 in a laterally proximal direction when the spring 320 is compressed. Additional details regarding the operation of the spring are provided herein below.

The outer tube member 316 may comprise one or more interior walls 322. Each interior wall 322 may comprise a recessed section 324 and an angled section 326. The recessed sections 324 may be positioned within the interior walls 322 such that they are laterally adjacent to the attachment members 318 when the body member 330 is positioned adjacent to a roof of an automobile comprising the actuation system 300. The angled sections 326 may be positioned within the interior walls 322 such that they are laterally adjacent to the attachment members 318 when the body member 330 is positioned generally away from the roof. In some embodiments, the angled sections 326 may be straight. In the current embodiment, the angled sections 326 is curved, such that the angled sections 326 are curved sections. In the present embodiment, the angled sections 326 have a curvature that is convex. There may be an equal number of attachment members 318, recessed sections 324, and angled sections 326.

As mentioned above, the spring 320 may exert a proximal lateral force on the inner tube member 314. Such lateral force may be sufficient to prevent the unintentional distal lateral translation of the inner tube member 314 and attachment members 318 from seating into the recessed sections 324, thereby enabling the free rotation of the inner tube member 314 and the body member 330 relative to the outer tube member 316.

The piston cap 312 may be positioned in fluidic communication with the pressurized gas container 304 such that when gas is released from the pressurized gas container and flows to the piston cap 312, the gas pressure increases on a surface of the piston cap 312, exerting a force thereon. Such fluidic communication may be established by tubing 306 attached to the pressurized gas container 304 at the point where the gas is released and forming a seal on at least one of the piston cap 312 or a proximal portion of the outer tube member 316 adjacent to the piston cap 312. In such embodiments, the piston cap 312 may form a seal with the outer tube member 316 to prevent the gas from leaking past the piston cap 312 into an interior of the outer tube member 316, thereby reducing the force exerted upon the piston cap 312. The force exerted by the increased gaseous pressure on the piston cap 312 may cause the distal lateral movement of the piston cap 312. Such distal lateral movement of the piston cap 312 may cause it to interface with the inner tube member 314 and exert a distal lateral force on the inner tube member. Such distal lateral force may cause the spring 320 to compress and the inner tube member 314 to translate laterally in a distal direction. More specifically, the distal lateral force exerted upon the inner tube member 314 by the piston cap 312 may be greater than the proximal lateral force exerted upon the inner tube member 314 by the spring 320, thereby laterally translating the inner tube member 314 distally.

The initial positioning of the recessed sections 324 and the angled sections 326 results in either the locking of the body member 330 or its rotation when the actuation system 300 is operated. When the body member 330 is initially positioned adjacent to the roof, the distal lateral translation of the inner tube member 314 may result in the attachment members 318 being seated within the recessed sections 324, thereby temporarily locking the body member 330 in its position adjacent the roof and preventing its rotation away from the roof. When the body member 330 is initially positioned away from the roof, the distal lateral translation of the inner tube member 314 may result in the attachment members 318 interfacing with the angled sections 326. The angled and/or curved surface of the angled sections 326 may cause the attachment members 318, and by extension the body member 330, to rotate. As described hereinabove, the rotation of the body member 330 may result in it being positioned in a desired rotational position that is generally unlikely to cause injury to an occupant of the automobile as their momentum carries them forward as a result of a collision. Such rotation may vary between automobiles. In some embodiments, the rotation will be within a range from 110 degrees rotation from the position from where the body member 330 is adjacent to the roof to 180 degrees. In some embodiments, the rotation will be within a range from 120 degrees to 170 degrees. In some embodiments, the rotation will be within a range from 130 degrees to 160 degrees. In some embodiments, the rotation will be within a range from 140 degrees to 150 degrees.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A sun visor actuation system comprising:
an attachment apparatus configured to attach to an automobile structure;
an arm member rotatably attached to the attachment apparatus;
a body member attached to the arm member;
an actuation system operable to both rotate the body member and prevent the rotation of the body member responsive to an indication of an imminent collision
a controller operably connected to the actuation system and configured to:
receive the indication of the imminent collision;
determine a present angular position of the body member;
upon determining the present angular position is in an angular range likely to cause injury to an occupant:
determine a desired second angular position for the body member that is outside the angular range likely to cause an injury to the occupant; and
operate the actuation member to rotate the body member from the present angular position to the desired second angular position; and
upon determining the present angular position is in an angular range unlikely to cause injury to the occupant, operate the actuation member to prevent rotation of the body member.

2. The sun visor actuation system of claim 1 wherein the actuation system comprises:
a first rotating member coupled to the actuation member; and
a second rotating member coupled to the first rotating member;
wherein operation of the actuation member causes the first rotating member to rotate; and
wherein the coupling of the second rotating member to the first rotating member causes the second rotating member to rotate responsive to rotation of the first rotating member.

3. The sun visor actuation system of claim 1 wherein the actuation member is one of a stepper motor and a solenoid.

4. The sun visor actuation system of claim 2 wherein each of the first rotating member and the second rotating member are pinion gears configured to engage with each other.

5. The sun visor actuation system of claim 4 wherein:
the attachment apparatus comprises an elbow section;
the first rotating member is positioned within a section of the attachment apparatus;
the second rotating member is positioned partially within a section of the attachment apparatus and partially within the arm member; and
wherein the first rotating member and the second rotating member are configured to engage with each other within the elbow section.

6. The sun visor actuation system of claim 1 wherein:
the controller is configured to receive an input from at least one of a supplemental restraint system, an anti-lock braking system, an advanced emergency braking system, an autonomous emergency braking system, a RADAR system, a LIDAR system, or a camera system; and
the controller is configured to determine if the input meets a criterion for engaging the actuation system.

7. The sun visor actuation system of claim 1 wherein the actuation system is operably coupled to a device associated with an automobile within which the sun visor actuation system is installed.

8. The sun visor actuation system of claim 1 wherein the angular range likely to cause injury is one of from 110 degrees to 180 degrees, from 120 degrees to 170 degrees, from 130 degrees to 160 degrees, and 140 degrees to 150 degrees; wherein the angular range is determined with respect to a roof of an automobile comprising the sun visor actuation system.

* * * * *